(12) United States Patent
Simon et al.

(10) Patent No.: US 8,386,121 B1
(45) Date of Patent: Feb. 26, 2013

(54) OPTIMIZED TUNER SELECTION FOR ENGINE PERFORMANCE ESTIMATION

(75) Inventors: Donald L. Simon, Olmsted Falls, OH (US); Sanjay Garg, Westlake, OH (US)

(73) Assignee: The United States of America as Represented by the Administrator of National Aeronautics and Space Administration, Washington, DC (US)

( * ) Notice: Subject to any disclaimer, the term of this patent is extended or adjusted under 35 U.S.C. 154(b) by 451 days.

(21) Appl. No.: 12/791,907

(22) Filed: Jun. 2, 2010

Related U.S. Application Data

(60) Provisional application No. 61/247,325, filed on Sep. 30, 2009.

(51) Int. Cl.
*G01M 17/00* (2006.01)
(52) U.S. Cl. ...................... 701/30.7; 701/29.1
(58) Field of Classification Search ............... 701/3, 54, 701/29.1, 30.7
See application file for complete search history.

(56) References Cited

U.S. PATENT DOCUMENTS

| | | | |
|---|---|---|---|
| 5,773,811 A | 6/1998 | Schramm, Jr. et al. | |
| 5,912,640 A | 6/1999 | Bradford et al. | |
| 6,063,129 A * | 5/2000 | Dadd et al. | 703/7 |
| 6,532,433 B2 | 3/2003 | Bharadwaj et al. | |
| 6,539,783 B1 * | 4/2003 | Adibhatla | 73/112.06 |
| 6,591,174 B2 | 7/2003 | Chung et al. | |
| 6,651,422 B1 * | 11/2003 | LeGare | 60/277 |
| 6,655,201 B2 | 12/2003 | Masson et al. | |
| 6,801,878 B1 | 10/2004 | Hintz et al. | |
| 7,028,667 B2 * | 4/2006 | Hori | 123/446 |
| 8,185,292 B2 * | 5/2012 | Litt | 701/100 |
| 2004/0030417 A1 * | 2/2004 | Gribble et al. | 700/29 |
| 2004/0153815 A1 * | 8/2004 | Volponi | 714/37 |
| 2004/0199300 A1 | 10/2004 | Gustafsson et al. | |
| 2004/0200464 A1 | 10/2004 | Ikemoto | |
| 2006/0074558 A1 | 4/2006 | Williamson et al. | |
| 2007/0051092 A1 * | 3/2007 | Pallett et al. | 60/276 |

(Continued)

FOREIGN PATENT DOCUMENTS

| | | |
|---|---|---|
| EP | 0 050 610 | 12/1986 |
| EP | 1 705 542 | 9/2006 |

(Continued)

OTHER PUBLICATIONS

Litt, Jonathan S.; Sowers, T. Shane, "Evaluation of an Outer Loop Retrofit Architecture for Intelligent Turbofan Engine Thrust Control", NASA/TM-2006-214460, ARL-TR 3880, AIAA-2006-5103, 42nd Joint Propulsion Conference, Sacramento, California, Jul. 9-12, 2006.

(Continued)

*Primary Examiner* — Hussein Elchanti
(74) *Attorney, Agent, or Firm* — McDonald Hopkins LLC; Robert H. Earp, III

(57) ABSTRACT

A methodology for minimizing the error in on-line Kalman filter-based aircraft engine performance estimation applications is presented. This technique specifically addresses the underdetermined estimation problem, where there are more unknown parameters than available sensor measurements. A systematic approach is applied to produce a model tuning parameter vector of appropriate dimension to enable estimation by a Kalman filter, while minimizing the estimation error in the parameters of interest. Tuning parameter selection is performed using a multi-variable iterative search routine which seeks to minimize the theoretical mean-squared estimation error. Theoretical Kalman filter estimation error bias and variance values are derived at steady-state operating conditions, and the tuner selection routine is applied to minimize these values. The new methodology yields an improvement in on-line engine performance estimation accuracy.

22 Claims, 7 Drawing Sheets

U.S. PATENT DOCUMENTS

| | | |
|---|---|---|
| 2008/0243352 A1 | 10/2008 | Healy |
| 2008/0281483 A1 | 11/2008 | Litt |
| 2009/0048730 A1* | 2/2009 | Akkaram et al. ............... 701/29 |
| 2009/0171634 A1 | 7/2009 | Bensch et al. |
| 2009/0212994 A1 | 8/2009 | Hamza et al. |
| 2009/0306837 A1* | 12/2009 | Ausman et al. .................. 701/3 |

FOREIGN PATENT DOCUMENTS

| | | |
|---|---|---|
| GB | 2 412 414 | 9/2005 |
| JP | 62-199948 | 9/1987 |
| JP | 6-288771 | 10/1994 |
| JP | 10-3399527 | 12/1998 |
| JP | 2004-279338 | 10/2004 |
| JP | 2005-248962 | 9/2005 |
| JP | 2006-336645 | 12/2006 |
| JP | 2007-240464 | 9/2007 |
| JP | 2008-138596 | 6/2008 |
| JP | 2009-68359 | 10/2010 |
| WO | 2007/060577 | 6/2007 |

OTHER PUBLICATIONS

Simon, Donald L.; Garg, Sanjay: "Optimal Tuner Selection for Kalman Filter-Based Aircraft Engine Performance Estimation", Proceedings of ASME Turbo Expo 2009; Power for Land, Sea and Air, GT2009, Orlando, Florida. Jun. 8-12, 2009.

\* cited by examiner

State variables, health parameters, and actuators

| State variables | Health parameters | Actuators |
| --- | --- | --- |
| Nf – fan speed | Fan efficiency | Wf – fuel flow |
| Nc – core speed | Fan flow capacity* | VSV – variable stator vane |
| | LPC efficiency* | VBV – variable bleed valve |
| | LPC flow capacity | |
| | HPC efficiency* | |
| | HPC flow capacity* | |
| | HPT efficiency* | |
| | HPT flow capacity* | |
| | LPT efficiency | |
| | LPT flow capacity* | |

* Health parameters selected as tuners in conventional estimation approach

FIG. 2

Sensed outputs and standard deviation as percent of operating point trim values

| Sensed output | Standard deviation (%) |
| --- | --- |
| Nf – fan speed | 0.25% |
| Nc – core speed | 0.25% |
| P24 – HPC inlet total pressure | 0.50% |
| T24 – HPC inlet total temperature | 0.75% |
| Ps30 – HPC exit static pressure | 0.50% |
| T30 – HPC exit total temperature | 0.75% |
| T48 – Exhaust gas temperature | 0.75% |

FIG. 3

Estimated auxiliary parameters

| Auxiliary parameter |
|---|
| T40 – Combustor exit temperature |
| T50 – LPT exit temperature |
| Fn – Net thrust |
| SmLPC – LPC stall margin |

FIG. 4

Auxiliary parameter squared estimation errors

| Tuners | Error | T40 (°R) | T50 (°R) | Fn (%) | SmLPC (%) |
|---|---|---|---|---|---|
| Subset of health parameters | Theor. sqr. bias | 0.00 | 561.76 | 3.84 | 3.28 |
| | Theor. variance | 74.76 | 29.65 | 0.48 | 0.34 |
| | Theor. sqr. error | 74.76 | 591.41 | 4.31 | 3.62 |
| | Exper. sqr. error | 74.90 | 583.29 | 4.27 | 3.60 |
| SVD tuner selection | Theor. sqr. bias | 0.00 | 512.46 | 4.05 | 5.28 |
| | Theor. variance | 65.99 | 67.21 | 0.80 | 1.31 |
| | Theor. sqr. error | 65.99 | 579.67 | 4.86 | 6.59 |
| | Exper. sqr. error | 66.20 | 579.39 | 4.98 | 6.76 |
| Systematic tuner selection | Theor. sqr. bias | 0.00 | 87.81 | 0.66 | 0.95 |
| | Theor. variance | 17.49 | 18.55 | 0.13 | 0.35 |
| | Theor. sqr. error | 17.49 | 106.35 | 0.79 | 1.30 |
| | Exper. sqr. error | 17.61 | 106.54 | 0.86 | 1.35 |

FIG. 5

Health parameter % squared estimation errors (nominal noise)

| Estimator | Error type | h1 | h2 | h3 | h4 | h5 | h6 | h7 | h8 | h9 | h10 | Sum |
|---|---|---|---|---|---|---|---|---|---|---|---|---|
| Kalman filter | Theor. squared bias | 1.26 | 1.48 | 2.28 | 1.22 | 0.00 | 0.00 | 0.74 | 0.00 | 1.97 | 3.06 | 12.00 |
| | Theor. variance | 0.73 | 0.19 | 0.80 | 0.45 | 0.40 | 0.68 | 0.21 | 0.21 | 0.34 | 0.08 | 4.09 |
| | Theor. squared | 2.00 | 1.67 | 3.07 | 1.66 | 0.40 | 0.68 | 0.96 | 0.21 | 2.32 | 3.14 | 16.09 |
| | Exper. squared | 1.82 | 1.60 | 2.77 | 1.59 | 0.41 | 0.68 | 0.97 | 0.21 | 2.13 | 3.15 | 15.31 |
| MAP estimator | Theor. squared bias | 2.42 | 1.75 | 3.53 | 1.90 | 0.47 | 0.96 | 1.00 | 0.16 | 2.47 | 3.17 | 17.81 |
| | Theor. variance | 0.22 | 0.27 | 0.16 | 0.64 | 0.69 | 0.71 | 0.36 | 0.36 | 0.17 | 0.09 | 3.68 |
| | Theor. squared | 2.63 | 2.02 | 3.69 | 2.54 | 1.16 | 1.67 | 1.36 | 0.52 | 2.64 | 3.26 | 21.48 |
| | Exper. squared | 2.52 | 1.89 | 3.44 | 2.45 | 1.14 | 1.57 | 1.34 | 0.51 | 2.49 | 3.24 | 20.60 |

FIG. 10

Health parameter % squared estimation errors (reduced noise)

| Estimator | Error type | h1 | h2 | h3 | h4 | h5 | h6 | h7 | h8 | h9 | h10 | Sum |
|---|---|---|---|---|---|---|---|---|---|---|---|---|
| Kalman filter | Theor. squared bias | 1.26 | 1.48 | 2.28 | 1.22 | 0.00 | 0.00 | 0.74 | 0.00 | 1.97 | 3.06 | 12.00 |
| | Theor. variance | 0.02 | 0.00 | 0.03 | 0.01 | 0.01 | 0.02 | 0.00 | 0.00 | 0.01 | 0.00 | 0.10 |
| | Theor. squared | 1.29 | 1.48 | 2.30 | 1.22 | 0.01 | 0.02 | 0.74 | 0.00 | 1.98 | 3.06 | 12.10 |
| | Exper. squared | 1.13 | 1.41 | 1.97 | 1.16 | 0.01 | 0.02 | 0.75 | 0.00 | 1.79 | 3.08 | 11.31 |
| MAP estimator | Theor. squared bias | 1.26 | 1.48 | 2.28 | 1.22 | 0.00 | 0.00 | 0.74 | 0.00 | 1.97 | 3.06 | 12.00 |
| | Theor. variance | 0.03 | 0.00 | 0.04 | 0.01 | 0.01 | 0.02 | 0.00 | 0.00 | 0.01 | 0.00 | 0.13 |
| | Theor. squared | 1.30 | 1.48 | 2.32 | 1.22 | 0.01 | 0.02 | 0.74 | 0.00 | 1.99 | 3.06 | 12.14 |
| | Exper. squared | 1.14 | 1.41 | 1.98 | 1.17 | 0.01 | 0.02 | 0.75 | 0.00 | 1.79 | 3.08 | 11.34 |

FIG. 11

OPTIMIZED TUNER SELECTION FOR ENGINE PERFORMANCE ESTIMATION

CROSS-REFERENCE TO RELATED APPLICATION

This application claims benefit from U.S. Provisional Patent Application No. 61/247,325, entitled "OPTIMAL TUNER SELECTION," filed on Sep. 30, 2009, which is hereby incorporated by reference in its entirety.

BACKGROUND

An emerging approach in the field of aircraft engine controls and health management is the inclusion of real-time on-board models for the in-flight estimation of engine performance variations. This technology, typically based on Kalman filter concepts, enables the estimation of unmeasured engine performance parameters that can be directly utilized by controls, prognostics and health management applications. A challenge which complicates this practice is the fact that an aircraft engine's performance is affected by its level of degradation, generally described in terms of unmeasurable health parameters such as efficiencies and flow capacities related to each major engine module. Through Kalman filter-based estimation techniques, the level of engine performance degradation can be estimated, given that there are at least as many sensors as parameters to be estimated. However, in an aircraft engine the number of sensors available is typically less than the number of health parameters presenting an under-determined estimation problem. A common approach to address this shortcoming is to estimate a sub-set of the health parameters, referred to as model tuning parameters. While this approach enables on-line Kalman filter-based estimation, it can result in "smearing" the effects of unestimated health parameters onto those which are estimated, and in turn introduce error in the accuracy of overall model-based performance estimation applications.

Recently, a new method has been presented based on singular value decomposition that selects a model tuning parameter vector of low-enough dimension to be estimated by a Kalman filter. The model tuning parameter vector, defined as q, was constructed as a linear combination of all health parameters, h, given by the equation $$q = V^* h, \quad (1)$$

where the transformation matrix, $V^*$, is selected applying singular value decomposition to capture the overall effect of the larger set of health parameters on the engine variables as closely as possible in the least squares sense.

SUMMARY

A new linear point design technique which applies a systematic approach to optimal tuning parameter selection is presented. This technique defines a transformation matrix, $V^*$, used to construct a tuning parameter vector which is a linear combination of all health parameters, and of low enough dimension to enable Kalman filter estimation. The new approach optimally selects the transformation matrix, $V^*$, to minimize the theoretical steady-state estimation error in the engine performance parameters of interest. There is no known closed form solution for optimally selecting $V^*$ to satisfy this objective. Therefore, a multivariable iterative search routine is applied to perform this function.

BRIEF DESCRIPTION OF THE SEVERAL VIEWS OF THE DRAWINGS

Objects and advantages together with the operation of the invention may be better understood by reference to the detailed description taken in connection with the following illustrations, wherein:

FIG. 2 illustrates a table of state variables, health parameters, and actuators;

FIG. 3 illustrates a table of sensed outputs and standard deviation as percent of operating point trim values;

FIG. 4 illustrates a table of estimated auxiliary parameters;

FIG. 5 illustrates a table of auxiliary parameter squared estimation errors;

FIG. 10 illustrates a table of health parameter squared estimation errors at nominal noise levels;

FIG. 11 illustrates a table of health parameter squared estimation errors at reduced noise levels.

DETAILED DESCRIPTION

Figure 1:
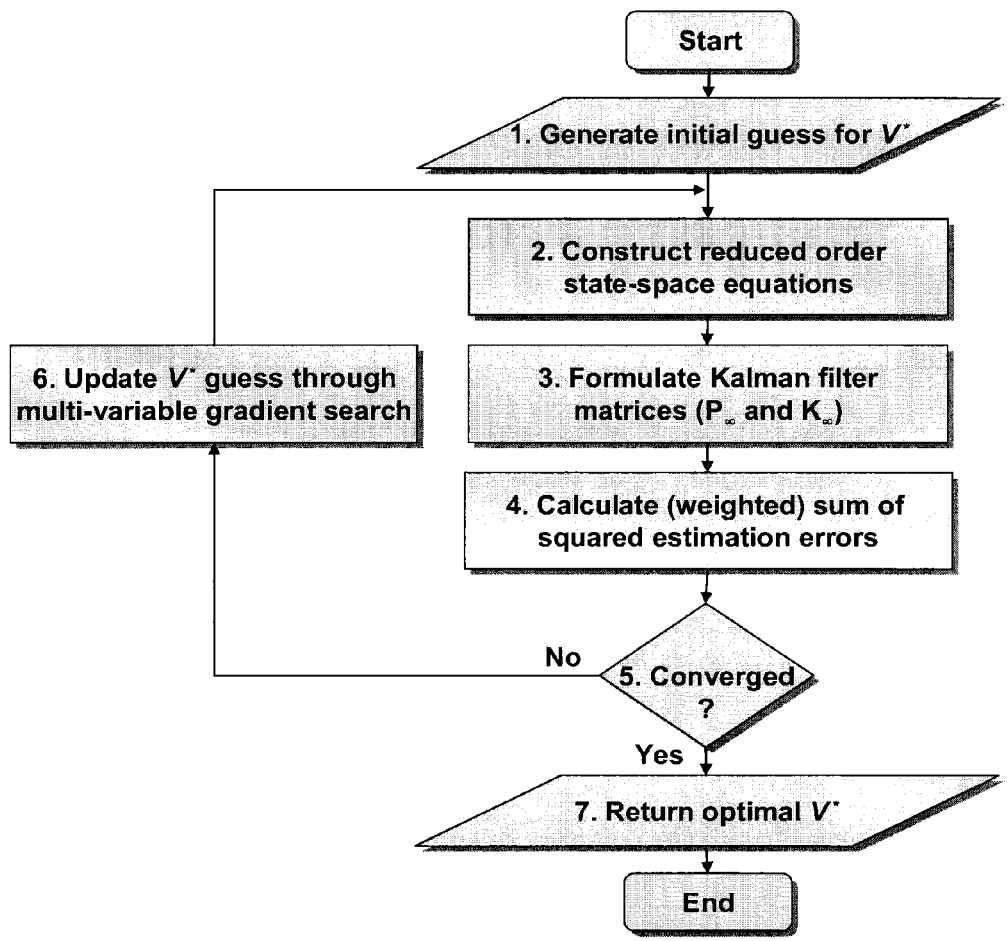
FIG. 1 illustrates a flow chart for performing an iterative optimal search.
Figure 6:
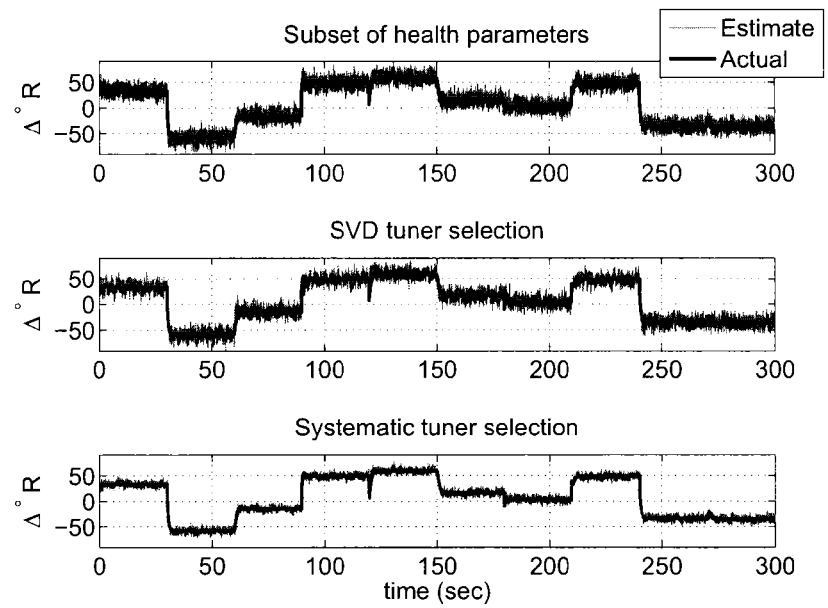
FIG. 6 illustrates a first graph of tuner comparisons.
Figure 7:
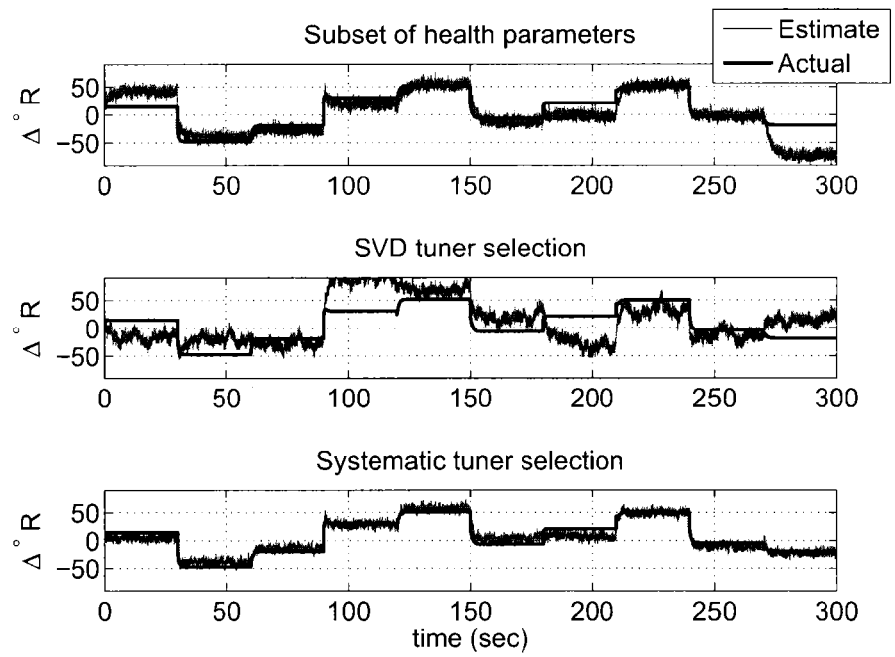
FIG. 7 illustrates a second graph of tuner comparisons.
Figure 8:
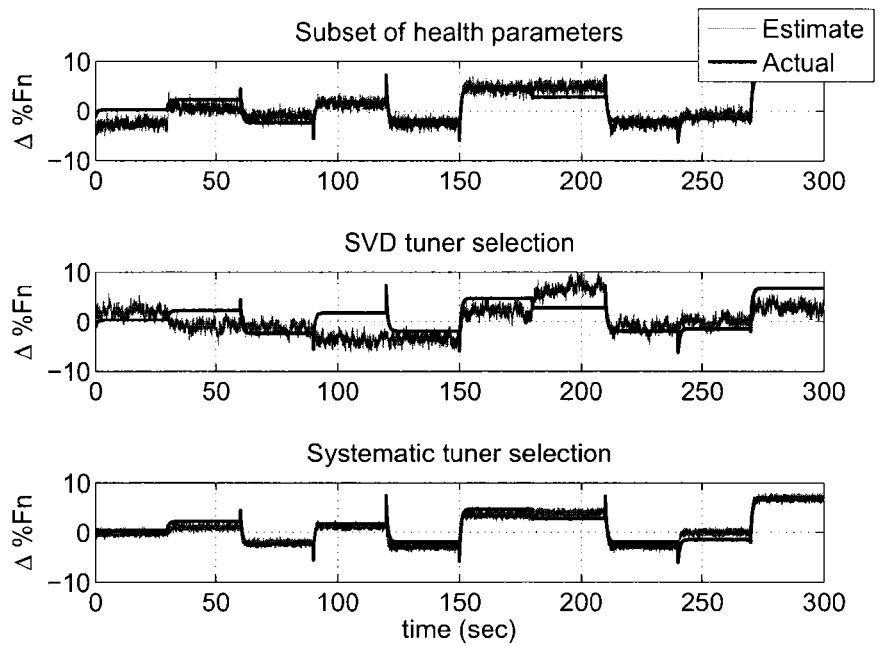
FIG. 8 illustrates a third graph of tuner comparisons.
Figure 9:
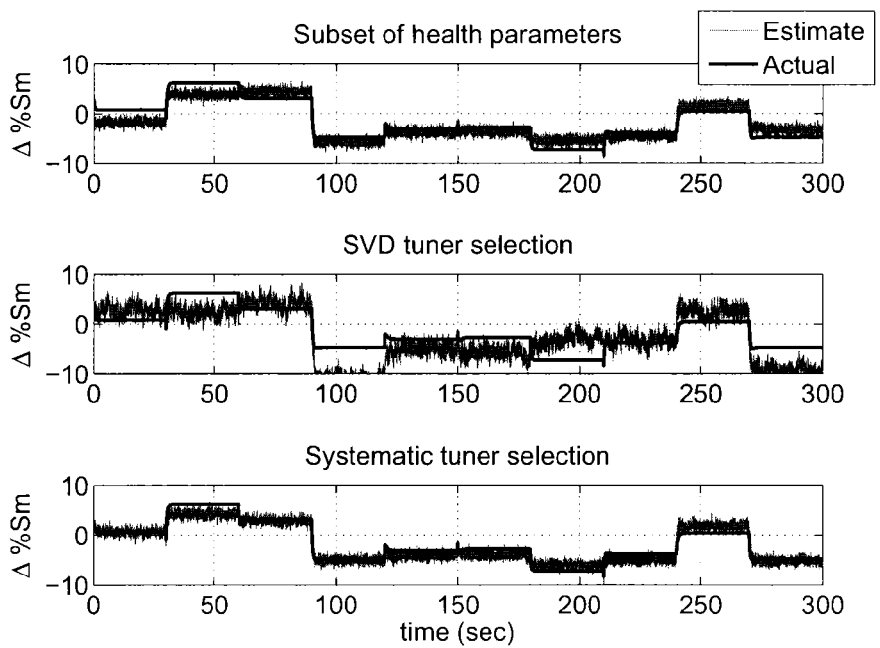
FIG. 9 illustrates a fourth graph of tuner comparisons.

Reference will now be made in detail to exemplary embodiments of the present invention, examples of which are illustrated in the accompanying drawings. It is to be understood that other embodiments may be utilized and changes may be made without departing from the respective scope of the present invention.

The following includes definitions of selected terms employed herein. The definitions include various examples and/or forms of components that fall within the scope of a term and that may be used for implementation. The examples are not intended to be limiting. Both singular and plural forms of terms may be within the definitions.

| | |
|---|---|
| $A, A_{xh}, A_{xq}$ | System Matrices |
| $B, B_{xh}, B_{xq}$ | |
| $C, C_{xh}, C_{xq}$ | |
| $D, F, F_{xh}, F_{xq}$ | |
| $G, L, M, N$ | |
| C-MAPSS | Commercial Modular Aero-Propulsion System Simulation |
| Fn | Net Thrust |
| $G_{xh}, G_x, G_h, G_z$ | Estimation bias matrices |
| H | Matrix which relates health parameter effects to steady-state engine outputs |
| HPC | High pressure compressor |
| HPT | High pressure turbine |
| I | Identity matrix |
| $K_\infty$ | Kalman filter gain |
| LPC | Low pressure compressor |
| LPT | Low pressure turbine |
| MAP | Maximum a posteriori |
| Nf | Fan speed |
| Nc | Core speed |
| $P_h, P_z$ | Health & auxiliary parameter covariance matrices |
| P24 | HPC inlet total pressure |
| Ps30 | HPC exit static pressure |
| $P_{\hat{x}\hat{h},k}, P_{\hat{x}\hat{q},k}, P_{\hat{z},k}$ | Covariance matrices of estimated parameters |
| $P_\infty$ | Kalman filter state estimation covariance matrix |
| $Q, Q_{xh}, Q_{xq}$ | Process noise covariance matrices |
| R | Measurement noise covariance matrix |

-continued

| | |
|---|---|
| SmLPC | LPC Stall margin |
| T24 | HPC inlet total temperature |
| T30 | HPC exit total temperature |
| T40 | Combustor exit temperature |
| T48 | Exhaust gas temperature |
| T50 | LPT exit temperature |
| V* | Transformation matrix relating $h_k$ to $q_k$ |
| VSV | Variable stator vane |
| VBV | Variable bleed valve |
| Wf | Fuel flow |
| $W_z$ | Auxiliary parameter weighting matrix |
| $h_k$ | Health parameter vector |
| $q_k$ | Kalman filter tuning parameter vector |
| $u_k$ | Actuator command vector |
| $v_k$ | Measurement noise vector |
| $w_k, w_{h,k}, w_{xh,k}$ | Process noise vectors |
| $x_k$ | State vector |
| $x_{xh,k}$ | Augmented state vector (xk and hk) |
| $x_{xq,k}$ | Reduced order state vector (xk and qk) |
| $y_k$ | Vector of measured outputs |
| $z_k$ | Vector of unmeasured (auxiliary) outputs |
| $E_{xq,k}$ | residual vector (estimate minus its expected value) |
| Subscripts | |
| k | Discrete time step index |
| xh | Augmented state vector (x and h) |
| xq | Reduced order state vector (x and q) |
| ss | Steady-state value |
| Superscripts | |
| † | Pseudo-inverse |
| ^ | Estimated value |
| ~ | Error value |
| – | Mean value |
| T | Transpose |
| Operators | |
| E[·] | Expected value of argument |
| tr {·} | Trace of matrix |
| SSEE(·) | Sum of squared estimation errors |
| WSSEE(·) | Weighted sum of squared estimation errors |
| $\|\cdot\|_F$ | Matrix Frobenius norm |

The discrete linear time-invariant engine state space equations about a linear design point are given as:

$$x_{k+1} = Ax_k + Bu_k + Lh_k + w_k;$$

$$y_k = Cx_k + Du_k + Mh_k + v_k$$

$$z_k = Fx_k + Fu_k + Nh_k \qquad (2)$$

where k is the time index, x is the vector of state variables, u is the vector of control inputs, y is the vector of measured outputs, and z is the vector of auxiliary (unmeasured) model outputs. The vector h represents the engine health parameters, which induce shifts in other variables as the health parameters deviate from their nominal values. The vectors w and v are uncorrelated zero-mean white noise input sequences. Q will be used to denote the covariance of w, and R to denote the covariance of v. The matrices A, B, C, D, F, G, L, M, and N are of appropriate dimension. The health parameters, represented by the vector h, are unknown inputs to the system. They may be treated as a set of biases, and are thus modeled without dynamics. With this interpretation Eq. (2) can be written as:

$$\begin{bmatrix} x_{k+1} \\ h_{k+1} \end{bmatrix} = \underbrace{\begin{bmatrix} A & L \\ 0 & I \end{bmatrix}}_{A_{xh}} \underbrace{\begin{bmatrix} x_k \\ h_k \end{bmatrix}}_{x_{xh,k}} + \underbrace{\begin{bmatrix} B \\ 0 \end{bmatrix}}_{B_{xh}} u_k + \underbrace{\begin{bmatrix} w_k \\ w_{h,k} \end{bmatrix}}_{w_{xh,k}} \qquad (3)$$

$$= A_{xh} x_{xh,k} + B_{xh} u_k + w_{xh,k}$$

$$y_k = \underbrace{[C \quad M]}_{C_{xh}} \underbrace{\begin{bmatrix} x_k \\ h_k \end{bmatrix}}_{x_{xh,k}} + Du_k + v_k$$

$$= C_{xh} x_{xh,k} + Du_k + v_k$$

$$z_k = \underbrace{[F \quad N]}_{F_{xh}} \underbrace{\begin{bmatrix} x_k \\ h_k \end{bmatrix}}_{x_{xh,k}} + Gu_k$$

$$= F_{xh} x_{xh,k} + Gu_k$$

The vector $w_{xh}$ is zero-mean white noise associated with the augmented state vector, $[x^T \ h^T]^T$, with a covariance of $Q_{xh}$. $W_{xh}$ consists of the original state process noise, w, concatenated with the process noise associated with the health parameter vector, $w_h$.

$$w_{xh,k} = \begin{bmatrix} w_k \\ w_{h,k} \end{bmatrix} \qquad (4)$$

The eigenvalues of $A_{xh}$ consist of the original eigenvalues of A plus an additional dim(h) eigenvalues located at 1.0 on the unit circle due to the augmentation. Thus, the new augmented system given in Eq. (3) has at least as many eigenvalues located on the unit circle as there are elements of h. Once the h vector is appended to the state vector, it may be directly estimated, provided that the realization in Eq. (3) is observable. Using this formulation, the number of health parameters that can be estimated is limited to the number of sensors, the dimension of y. Since in an aircraft gas turbine engine there are usually fewer sensors than health parameters, the problem becomes one of choosing the best set of tuners for the application. A methodology is presented for the optimal selection of a model tuning parameter vector, q, of low-enough dimension to be estimated by a Kalman filter, while minimizing the estimation error in the model variables of interest. The steps in this process include construction of the reduced-order state space model, formulation of the Kalman filter estimator, calculation of the mean sum of squared estimation errors, and optimal selection of the transformation matrix to minimize the estimation error.

The first step is to construct a reduced-order state space model. The model tuning parameter vector, q, is constructed as a linear combination of all health parameters, h, given by $$q = V^* h \qquad (5)$$

where $q \in P^m$, $h \in P^p$, $m < p$, and $V^*$ is an m×p transformation matrix of rank m, applied to construct the tuning parameter vector. An approximation of the health parameter vector, $\hat{h}$, can be obtained as $$\hat{h} = V^{*\dagger} q \qquad (6)$$

where $V^{*\dagger}$ is the pseudo-inverse of $V^*$. Substituting Eq. (6) into Eq. (3) yields the following reduced order state space equations which will be used to formulate the Kalman filter:

$$\begin{bmatrix} x_{k+1} \\ q_{k+1} \end{bmatrix} = \underbrace{\begin{bmatrix} A & LV^{*\dagger} \\ 0 & I \end{bmatrix}}_{A_{xq}} \underbrace{\begin{bmatrix} x_k \\ q_k \end{bmatrix}}_{x_{xq,k}} + \underbrace{\begin{bmatrix} B \\ 0 \end{bmatrix}}_{B_{xq}} u_k + \underbrace{\begin{bmatrix} w_k \\ w_{q,k} \end{bmatrix}}_{w_{xq,k}} \qquad (7)$$

$$= A_{xq} x_{xq,k} + B_{xq} u_k + w_{xq,k}$$

-continued $$y_k = \underbrace{[C \quad MV^{*\dagger}]}_{C_{xq}} \underbrace{\begin{bmatrix} x_k \\ q_k \end{bmatrix}}_{x_{xq,k}} + Du_k + v_k$$

$$= C_{xq}x_{xq,k} + Du_k + v_k$$

$$z_k = \underbrace{[F \quad NV^{*\dagger}]}_{F_{xq}} \underbrace{\begin{bmatrix} x_k \\ q_k \end{bmatrix}}_{x_{xq,k}} + Gu_k$$

$$= F_{xq}x_{xq,k} + Gu_k$$

The state process noise, $w_{xq}$, and its associated covariance, $Q_{xq}$, for the reduced order system are calculated as:

$$w_{xq,k} = \begin{bmatrix} I & 0 \\ 0 & V^* \end{bmatrix} w_{xh,k} = \begin{bmatrix} I & 0 \\ 0 & V^* \end{bmatrix} \begin{bmatrix} w_k \\ w_{h,k} \end{bmatrix} \quad (8)$$

$$Q_{xq} = \begin{bmatrix} I & 0 \\ 0 & V^* \end{bmatrix} Q_{xh} \begin{bmatrix} I & 0 \\ 0 & V^* \end{bmatrix}^T$$

Next, the Kalman filter estimator is formulated. Here, steady-state Kalman filtering may be applied. This means that while the Kalman filter is a dynamic system, the state estimation error covariance matrix and the Kalman gain matrix are invariant—instead of updating these matrices each time step they are held constant. Given the reduced order linear state space equations shown in Eq. (7), the state estimation error covariance matrix, $P_\infty$, is calculated by solving the following Ricatti equation:

$$P_\infty = A_{xq}P_\infty A_{xq}^T - A_{xq}P_\infty C_{xq}^T(C_{xq}P_\infty C_{xq}^T + R)^{-1}C_{xq}P_\infty A_{xq}^T + Q_{xq} \quad (9)$$

The steady-state Kalman filter gain, $K_\infty$, can then be calculated as follows:

$$K_\infty = P_\infty C_{xq}^T(C_{xq}P_\infty C_{xq}^T + R)^{-1} \quad (10)$$

and, assuming steady-state, open-loop operation (u=0), the Kalman filter estimator takes the following form $$\hat{x}_{xq,k} = A_{xq}\hat{x}_{xq,k-1} + K_\infty(y_k - C_{xq}A_{xq}\hat{x}_{xq,k-1}) \quad (11)$$

The reduced order state vector estimate, $\hat{x}_{xq,k}$, produced by Eq. (11) can be used to produce an estimate of the augmented state vector, and the auxiliary parameter vector as follows:

$$\hat{x}_{xh,k} = \begin{bmatrix} I & 0 \\ 0 & V^{*\dagger} \end{bmatrix} \hat{x}_{xq,k} \quad (12)$$

$$\hat{z}_k = [F \quad NV^{*\dagger}]\hat{x}_{xq,k}$$

The estimation errors in $\hat{x}_{xh,k}$ and $\hat{z}_k$ are defined as the difference between the estimated and actual values:

$$\tilde{x}_{xh,k} = \hat{x}_{xh,k} - x_{xh,k}$$

$$\tilde{z}_k = \hat{z}_k - z_k \quad (13)$$

Due to the under-determined nature of the estimation problem, it will be impossible for the Kalman filter estimator to completely restore all information when transforming $\hat{q}$ into $\hat{h}$. As such, the Kalman filter will be a biased estimator, meaning the expected values of $\tilde{x}_{h,k}$ and $\tilde{z}_k$ will be non-zero. The estimation errors can be considered to consist of two components: an estimation error bias, and an estimation variance. The estimation error bias vectors are equivalent to the mean estimation error vectors defined as:

$$\bar{\tilde{x}}_{xh,k} = E[\tilde{x}_{xh,k}] = E[\hat{x}_{xh,k} - x_{xh,k}] \quad (14)$$

$$\bar{\tilde{z}}_k = E[\tilde{z}_k] = E[\hat{z}_k - z_k]$$

where the operator $E[\bullet]$ represents the expected value of the argument. The variance of the estimates can be found by constructing their respective estimation covariance matrices:

$$P_{\hat{x}h,k} = E[(\hat{x}_{xh,k} - E[\hat{x}_{xh,k}])(\hat{x}_{xh,k} - E[\hat{x}_{xh,k}])^T] \quad (15)$$

$$P_{\hat{z},k} = E[(\hat{z}_k - E[\hat{z}_k])(\hat{z}_k - E[\hat{z}_k])^T]$$

Diagonal elements of the covariance matrices will reflect the variance in individual parameter estimates, while off-diagonal elements reflect the covariance between parameter estimates. The overall sum of squared estimation errors (SSEE) can be obtained by combining the estimation error bias and estimation variance information as $$SSEE(\hat{x}_{xh,k}) = \bar{\tilde{x}}_{xh,k}^T \bar{\tilde{x}}_{xh,k} + tr\{P_{\hat{x}h,k}\}$$

$$SSEE(\hat{z}_k) = \bar{\tilde{z}}_k^T \bar{\tilde{z}}_k + tr\{P_{\hat{z},k}\} \quad (16)$$

where $tr\{\bullet\}$ represents the trace (sum of the diagonal elements) of the matrix. As described herein, theoretical values for each error component will be derived assuming steady-state, open-loop (u=0) operating conditions. First, the estimation error bias is derived, followed by a derivation of the estimation variance.

The estimation error biases, $\bar{\tilde{x}}_{xh,k}$ and $\bar{\tilde{z}}_k$, can be analytically derived for an arbitrary health parameter vector, h, at steady-state operating conditions. This is done taking advantage of the following expected value properties at steady-state open-loop operating conditions $$E[x_{k+1}] = E[x_k] = x_{ss}$$

$$E[h_k] = h$$

$$E[x_{xh,k}] = x_{xh,ss}$$

$$E[y_k] = y_{ss}$$

$$E[z_k] = z_{ss}$$

$$E[u_k] = 0$$

$$E[w_k] = 0$$

$$E[v_k] = 0$$

$$E[\hat{x}_{xq,k}] = E[\hat{x}_{xq,k-1}] = \bar{\hat{x}}_{xq,ss}$$

$$E[\hat{x}_{xh,k}] = \bar{\hat{x}}_{xh,ss}$$

$$E[\hat{z}_k] = \bar{\hat{z}}_{ss} \quad (17)$$

where the subscript "ss" denotes steady-state operation. By taking expected values of Eq. (2), $x_{ss}$, $y_{ss}$ and $z_{ss}$ can be written as functions of the health parameter vector h $$E[x_{k+1}] = A \cdot E[x_k] + B \cdot E[u_k] + L \cdot E[h_k] + E[w_k]$$

$$x_{ss} = Ax_{ss} + Lh$$

$$x_{ss} = (I - A)^{-1}Lh \quad (18)$$

$E[y_k] = C \cdot E[x_k] + D \cdot E[u_k] + M \cdot E[h_k] + E[v_k]$ $y_{ss} = Cx_{ss} + Mh$ $y_{ss} = (C(I-A)^{-1}L + M)h$     (19)

$E[z_k] = F \cdot E[x_k] + G \cdot E[u_k] + N \cdot E[h_k]$ $z_{ss} = Fx_{ss} + Nh$ $z_{ss} = (F(I-A)^{-1}L + N)h$     (20)

Next, by taking expected values of both sides of Eq. (11), the expected value of $\hat{x}_{xq,k}$ can be obtained as a function of $y_{ss}$:

$E[\hat{x}_{xq,k}] = A_{xq} \cdot E[\hat{x}_{xq,k-1}] \ldots$ $+ K_\infty(E[y_k] - C_{xq}A_{xq} \cdot E[\hat{x}_{xq,k-1}])$ $\bar{\hat{x}}_{xq,ss} = A_{xq}\bar{\hat{x}}_{xq,ss} + K_\infty(y_{ss} - C_{xq}A_{xq}\bar{\hat{x}}_{xq,ss})$ $\bar{\hat{x}}_{xq,ss} = (I - A_{xq} + K_\infty C_{xq}A_{xq})^{-1} K_\infty y_{ss}$     (21)

Then, making the substitution $y_{ss} = (C(I-A)^{-1}L+M)^h$ given in Eq. (19), the expected steady-state value of $\hat{x}_{xq,k}$ can be written as a function of h $\bar{\hat{x}}_{xq,ss} = (I - A_{xq} + K_\infty C_{xq}A_{xq})^{-1} K_\infty (C(I-A)^{-1}L + M)h$     (22)

The steady-state augmented state estimation error bias can then be found, and partitioned into error bias information for the original state vector, $\bar{x}_{ss}$, and the health parameter vector, $\bar{\tilde{h}}_{ss}$, by combining Eqs. (12), (14), (18) and (22) to yield $\bar{\tilde{x}}_{xh,ss} = E[\hat{x}_{xh,k} - x_{xh,k}]$     (23)

$\bar{\tilde{x}}_{xh,ss} = \bar{\hat{x}}_{xh,ss} - x_{xh,ss}$ $\bar{\tilde{x}}_{xh,ss} = \begin{bmatrix} \bar{\tilde{x}}_{ss} \\ \bar{\tilde{h}}_{ss} \end{bmatrix} = \begin{bmatrix} I & 0 \\ 0 & V^{*\dagger} \end{bmatrix} \bar{\hat{x}}_{xq,ss} - x_{xh,ss}$ $\bar{\tilde{x}}_{xh,ss} = \begin{bmatrix} \bar{\tilde{x}}_{ss} \\ \bar{\tilde{h}}_{ss} \end{bmatrix} =$ $\underbrace{\begin{bmatrix} \begin{bmatrix} I & 0 \\ 0 & V^{*\dagger} \end{bmatrix}(I - A_{xq} + K_\infty C_{xq}A_{xq})^{-1} \ldots \times \\ K_\infty[C(I-A)^{-1}L + M] \ldots - \\ \begin{bmatrix} (I-A)^{-1}L \\ I \end{bmatrix} \end{bmatrix}}_{G_{sh}} h$ $\bar{\tilde{x}}_{xh,ss} = \begin{bmatrix} \bar{\tilde{x}}_{ss} \\ \bar{\tilde{h}}_{ss} \end{bmatrix} = G_{xh}h$ The steady-state auxiliary parameter estimation error bias can also be derived by combining Eqs. (12), (14), (20) and (22) to yield $\bar{\tilde{z}}_{ss} = E[\hat{z}_k - z_k]$     (24)

$\bar{\tilde{z}}_{ss} = \bar{\hat{z}}_{ss} - z_{ss}$ $\bar{\tilde{z}}_{ss} = [F \ NV^{*\dagger}]\bar{\hat{x}}_{xq,ss} - z_{ss}$ -continued $\bar{\tilde{z}}_{ss} = \underbrace{\begin{bmatrix} [F \ NV^{*\dagger}](I - A_{xq} + K_\infty C_{xq}A_{xq})^{-1} \ldots \times \\ K_\infty[C(I-A)^{-1}L + M] \ldots - \\ [F(I-A)^{-1}L + N] \end{bmatrix}}_{G_z} h$ $\bar{\tilde{z}}_{ss} = G_z h$ The estimation error bias equations given in Eqs. (23) and (24) are functions of an arbitrary health parameter vector, h. As such they are representative of the parameter estimation error biases in a single engine, at a given point in its lifetime of use where its deterioration is represented by the health parameter vector h. The average sum of squared estimation error biases across a fleet of engines can be calculated as $\bar{\tilde{x}}^2_{xh,fleet} \equiv E[\bar{\tilde{x}}^T_{xh,ss}\bar{\tilde{x}}_{xh,ss}] = E[tr\{\bar{\tilde{x}}_{xh,ss}\bar{\tilde{x}}^T_{xh,ss}\}]$     (25)

$= E[tr\{G_{xh}hh^T G^T_{xh}\}]$ $= tr\{G_{xh} \cdot \underbrace{E[hh^T]}_{P_h} G^T_{xh}\}$ $= tr\{G_{xh}P_h G^T_{xh}\}$ $\bar{\tilde{z}}^2_{fleet} \equiv E[\bar{\tilde{z}}^T_{ss}\bar{\tilde{z}}_{ss}] = E[tr\{\bar{\tilde{z}}_{ss}\bar{\tilde{z}}^T_{ss}\}]$     (26)

$= E[tr\{G_z hh^T G^T_z\}]$ $= tr\{G_z \cdot \underbrace{E[hh^T]}_{P_h} G^T_z\}$ $= tr\{G_z P_h G^T_z\}$ where the matrix $P_h$, defined as $E[hh^T]$, reflects a priori or historical knowledge of the covariance in the health parameters across all engines. If available, it can be used to predict the sum of squared estimation errors biases as shown in (25) and (26).

Next, derivations are presented for the augmented state estimate and auxiliary parameter estimate covariance matrices, $P_{\hat{x}h,k}$ and $P_{\hat{z},k}$, respectively. These matrices will be calculated as a function of the reduced-order state vector estimation covariance matrix, $P_{\hat{x}q,k}$, which is defined as $P_{\hat{x}q,k} = E\left[\underbrace{(\hat{x}_{xq,k} - E[\hat{x}_{xq,k}])}_{\varepsilon_{xq,k}} \underbrace{(\hat{x}_{xq,k} - E[\hat{x}_{xq,k}])^T}_{\varepsilon^T_{xq,k}}\right]$     (27)

where the vector $\varepsilon_{xq,k}$ is defined as the residual between $\hat{x}_{xq,k}$, at time k and its expected value. Since $E[\hat{x}_{xq,k}] = \bar{\hat{x}}_{xq,ss}$, $\varepsilon_{xq,k}$ can be obtained by subtracting Eq. (21) from Eq. (11)

$\varepsilon_{xq,k} = \hat{x}_{xq,k} - E[\hat{x}_{xq,k}]$     (28)

$= \hat{x}_{xq,k} - \bar{\hat{x}}_{xq,ss}$ $= \underbrace{A_{xq}\hat{x}_{xq,k-1} + K_\infty(y_k - C_{xq}A_{xq}\hat{x}_{xq,k-1})}_{\hat{x}_{xq,k}} \ldots -$ $\underbrace{(A_{xq}\bar{\hat{x}}_{xq,ss} + K_\infty(y_{ss} - C_{xq}A_{xq}\bar{\hat{x}}_{xq,ss}))}_{\bar{\hat{x}}_{xq,ss}}$ $= (A_{xq} - K_\infty C_{xq}A_{xq})(\hat{x}_{xq,k-1} - \bar{\hat{x}}_{xq,ss}) + K_\infty(y_k - y_{ss})$ Making the substitutions $\epsilon_{xq,k-1} = \hat{x}_{xq,k-1} - \bar{x}_{xq,ss}$, and $v_k = y_k - y_{ss}$ yields $$\epsilon_{xq,k} = (A_{xq} - K_\infty C_{xq} A_{xq})\epsilon_{xq,k-1} + K_\infty v_k \quad (29)$$

The estimation covariance matrix $P_{\hat{x}\hat{q},k}$ is then calculated as $$P_{\hat{x}\hat{q},k} = E[\epsilon_{xq,k}\epsilon_{xq,k}^T] \quad (30)$$

$$= [A_{xq} - K_\infty C_{xq} A_{xq}] E[\epsilon_{xq,k-1}\epsilon_{xq,k-1}^T] \ldots \times$$
$$[A_{xq} - K_\infty C_{xq} A_{xq}]^T \ldots +$$
$$[A_{xq} - K_\infty C_{xq} A_{xq}] E[\epsilon_{xq,k-1} v_k^T] K_\infty^T \ldots +$$
$$K_\infty E[v_k \epsilon_{xq,k-1}^T][A_{xq} - K_\infty C_{xq} A_{xq}]^T \ldots +$$
$$K_\infty E[v_k v_k^T] K_\infty^T$$

The substitutions $E[\epsilon_{xq,k-1}\epsilon_{xq,k-1}^T] = P_{\hat{x}\hat{q},k-1}$, and $E[v_k v_k^T] = R$ can be made in the above equation. Since $\epsilon_{xq,k-1}$ and $v_k^T$ are uncorrelated, the substitution $E[\epsilon_{xq,k-1} v_k^T] = E[v_k \epsilon_{xq,k-1}^T] = 0$ can also be made, producing $$P_{\hat{x}\hat{q},k} = [A_{xq} - K_\infty C_{xq} A_{xq}] P_{\hat{x}\hat{q},k-1} [A_{xq} - K_\infty C_{xq} A_{xq}]^T + K_\infty R K_\infty^T \quad (31)$$

At steady-state operating conditions $P_{\hat{x}\hat{q},k-1} = P_{\hat{x}\hat{q},k}$. Making this substitution in (31) produces the following Ricatti equation which can be solved for $P_{\hat{x}\hat{q},k}$:

$$P_{\hat{x}\hat{q},k} = [A_{xq} - K_\infty C_{xq} A_{xq}] P_{\hat{x}\hat{q},k} [A_{xq} - K_\infty C_{xq} A_{xq}]^T + K_\infty R K_\infty^T \quad (32)$$

It should be noted that $P_{\hat{x}\hat{q},k}$ obtained by solving (32) will be identical to $P_\infty$ produced via Eq. (9) if the system's actual state process noise covariance is identical to the $Q_{xq}$ assumed in the design of the Kalman filter. However, Q is often treated as a Kalman filter design parameter to provide acceptable dynamic response. For the purpose of this derivation, we have assumed a steady-state operating condition where the state variables and health parameters are invariant, and thus the actual system process noise is zero (i.e., $w_{xh,k} = 0$). In this case $P_{\hat{x}\hat{q},k}$ will not equal $P_\infty$. Once $P_{\hat{x}\hat{q},k}$ is obtained, it can be used to calculate $P_{\hat{x}h,k}$, the covariance of $\hat{x}_{xh,k}$, which is defined as $$P_{\hat{x}h,k} = \begin{bmatrix} I & 0 \\ 0 & V^{*\dagger} \end{bmatrix} P_{\hat{x}\hat{q},k} \begin{bmatrix} I & 0 \\ 0 & V^{*\dagger} \end{bmatrix}^T \quad (33)$$

The augmented state vector estimation covariance given in Eq. (33) can be partitioned into covariance information for the original state vector, $P_{\hat{x},k}$ (upper left corner of the $P_{\hat{x}h,k}$ matrix), and the health parameter vector, $P_{\hat{h},k}$ (lower right corner of the $P_{\hat{x}h,k}$ matrix)

$$P_{\hat{x}h,k} = \begin{bmatrix} P_{\hat{x},k} & \ldots \\ \ldots & P_{\hat{h},k} \end{bmatrix} \quad (34)$$

The $P_{\hat{x}\hat{q},k}$ matrix from Eq. (32) can also be used to calculate $P_{\hat{z},k}$, the covariance in the estimation of $z_k$, which is equivalent to $E[(\hat{z}_k - E[\hat{z}_k])(\hat{z}_k - E[\hat{z}_k])^T]$ $$P_{\hat{z},k} = [F N V^{*\dagger}] P_{\hat{x}\hat{q},k} [F N V^{*\dagger}]^T \quad (35)$$

The variance in the estimates $\hat{x}_{xh,k}$ and $\hat{z}_k$ can be obtained from the diagonals of the covariance matrices produced by (33) and (35) respectively.

Once Eqs. (25), (26), (33) and (35) are obtained, they may be used to analytically calculate the mean sum of squared estimation errors over all engines by combining the respective estimation error bias and estimation variance information as previously shown in Eq. (16). The mean augmented state vector sum of squared estimation errors, $SSEE(\hat{x}_{xh,fleet})$, and the mean auxiliary parameter vector sum of squared estimation errors, $SSEE(\hat{x}_{xh,fleet})$, become $$SSEE(\hat{x}_{xh,fleet}) = \bar{\hat{x}}_{xh,fleet}^2 + tr\{P_{\hat{x}h,k}\} \quad (36)$$
$$= tr\{G_{xh} P_h G_{xh}^T + P_{\hat{x}h,k}\}$$

$$SSEE(\hat{z}_{fleet}) = \bar{\hat{z}}_{fleet}^2 + tr\{P_{\hat{z},k}\}$$
$$= tr\{G_z P_h G_z^T + P_{\hat{z},k}\}$$

If required, a weighted sum approach can be applied to normalize the contributions of individual auxiliary parameter estimation errors. This is often necessary as there may be several orders of magnitude difference between the auxiliary parameters of interest. A weighted sum approach prevents domination by individual parameters. In this study a diagonal auxiliary parameter weighting matrix, $W_z$, is applied based on the inverse of auxiliary parameter variance (obtained from the main diagonal of the auxiliary parameter covariance matrix, $P_z$)

$$P_z = [F(I-A)^{-1} L + N] P_h [F(I-A)^{-1} L + N]^T \quad (37)$$

$$W_z = \begin{bmatrix} P_{z,11} & 0 & 0 \\ 0 & \ddots & 0 \\ 0 & 0 & P_{z,ii} \end{bmatrix}^{-1}$$

$W_z$ is then applied to calculate of a "weighted" sum of auxiliary parameter squared estimation errors given as $$WSSEE(\hat{z}_{fleet}) = tr\{W_z [G_z P_h G_z^T + P_{\hat{z},k}]\} \quad (38)$$

From Eqs. (23), (24), (33) and (35) it can be observed that both bias and variance are affected by the selection of the transformation matrix, $V^*$. The sum of squared estimation error terms derived in this section give rise to an optimization problem: selecting $V^*$ to minimize the squared estimation error in the Kalman filter produced parameter estimates. This could include health parameter estimates, auxiliary parameter estimates, or a combination of parameters. Although there is no known closed form solution for optimally selecting the $V^*$ matrix to satisfy the objective of minimizing estimation errors, a multi-parameter iterative search method has been developed to perform this task, and will be described in the next section.

Prior to initiating the search for an optimal $V^*$, specific system design information must be defined or obtained. This includes specifying the auxiliary parameters to be estimated, generating system state space equations at a fleet average (50% deteriorated) engine trim point, defining measurement noise covariance matrix, R, defining augmented state process noise covariance matrix, $Q_{xh}$, and defining fleet average health parameter covariance, $P_h$.

Some additional clarification is provided regarding the selection of $P_h$ and $Q_{xh}$ as the distinction between these two covariance matrices may not be immediately obvious. $P_h$ defines the expected health parameter covariance across all engines. It may be based on past knowledge gained from engine gas path analysis programs and/or historical studies of engine module performance deterioration. Conversely, $Q_{x,h}$ defines the expected process noise covariance in the state variables and health parameters of an individual engine, at a single discrete time step, k. The selection of $Q_{x,h}$ will directly impact the dynamic response and the variance of the estimates generated.

After the necessary system information has been obtained, the search for an optimal transformation matrix to minimize the Kalman filter sum of squared estimation errors can commence. This is performed using the lsqnonlin function of the Matlab® Optimization Toolbox. This function applies an iterative search to find the least squares solution of a user-specified multivariable optimization problem. A flow chart depicting the steps in this optimal iterative search is shown in FIG. 1, and a further description of each step is given below.

Upon startup, an initial random guess of V* is generated. It is selected such that the matrix Frobenius norm $\|V^*\|_F=1$. This requirement is applied to help prevent convergence to a poorly scaled solution. The reduced order state-space model is then constructed, (Eq. (7)). The Kalman filter is then formulated by first calculating the estimation covariance matrix, $P_\infty$ (Eq. (9)), then calculating the Kalman gain matrix, $K_\infty$, (Eq. (10)). Next, the sum of squared estimation errors (Eq. (36)), or weighted sum of squared estimation errors (Eq. (38)) is calculated. On each iteration the change in SSEE (or WSSEE) relative to the previous iteration is assessed to determine if convergence within a user specified tolerance has been achieved. If convergence is not achieved then, V* is updated via the Matlab® lsqnonlin function, again requiring that $\|V^*\|_F=1$, and then returning to again construct the reduced order state-space equations. If convergence is achieved then he optimization routine returns the optimal value of V*, and ends.

The transformation matrix returned by the optimization routine may not be unique. Thus, different matrices can be found which produce a global minimum of the objective function. Experience has also shown that the optimization routine will usually return a V* matrix which satisfies, or nearly satisfies (i.e. within 5%), the global minimum of the objective function. However, in order to guard against potential convergence to a local minimum, it is prudent to run the optimization routine multiple times, each time starting with a different initial guess for V*. This is only to assure the designer that the global minimum is achieved, not to produce a consistent V*. It should be emphasized that the optimal search for V* is only conducted off-line during the estimator design process. This calculation is not conducted as part of the on-line real-time Kalman filter implementation, and thus places no additional computational burden upon it.

In an applied example of the methods described herein, a linearized cruise operating point extracted from the NASA Commercial Modular Aero-Propulsion System Simulation (C-MAPSS) high-bypass turbofan engine model is used to evaluate the new systematic tuner selection methodology. The linear model has two state variables, ten health parameters, and three control inputs, all shown in FIG. 2. The model's seven sensed outputs, and corresponding sensor noise standard deviation, are shown in FIG. 3. The auxiliary output parameters of interest to be estimated are shown in FIG. 4. The linear model is used as the truth model for this application example. The model is run open-loop, so all control inputs remain at 0, i.e., they do not deviate from the trim value for the linear model and no actuator bias is present. Deviations in all ten health parameters are assumed to be uncorrelated, and randomly shifted from their trim conditions with a standard deviation of ±0.02 (±2%). Since a parameter's variance is equal to its standard deviation squared, the health parameter covariance matrix, $P_h$, is defined as a diagonal matrix with all diagonal elements equal to 0.0004.

Next, the estimation accuracy of the systematic approach for selecting Kalman filter tuning parameters will be compared to the conventional approach of selecting a sub-set of health parameters to serve as tuners (the seven health parameters denoted with "*" in FIG. 2), and the singular value decomposition approach to tuner selection. FIG. 5 shows a comparison of the theoretically predicted estimation errors (squared bias, variance, and total squared error) and experimentally obtained squared estimation errors for each of the three tuner selection approaches. T40 and T50 estimation errors are shown in squared degrees Rankine, and Fn and SmLPC estimation errors are shown in squared percent net thrust and squared percent stall margin respectively. The experimental results were obtained through a Monte Carlo simulation analysis where the health parameters varied over a random distribution in accordance with the covariance matrix, $P_h$. The test cases were concatenated to produce a single time history input which was provided to the C-MAPSS linear discrete state space model given in Eq. (2), with an update rate of 15 ms. Each individual health parameter test case lasted 30 s.

At the completion of each 30 s test case, the health parameter vector input instantaneously transitioned to the next test case. A total of 375 30 s test cases were evaluated, resulting in an 11,250 s input time history. Three separate Kalman filters were implemented using the three tuner selection approaches. The experimental estimation errors were determined by calculating the mean squared error between estimated and actual values during the last 10 s of each 30 s test case. The error calculation is based on only the last 10 s so that engine model outputs and Kalman estimator outputs have reached a quasi-steady-state operating condition prior to calculating the error. This ensures that the experimental results are consistent with the theoretically predicted estimation errors which were derived assuming steady-state operation.

From FIG. 5 it can be seen that the theoretically predicted and the experimentally obtained squared estimation errors exhibit good agreement. If the number of random test cases were increased to a suitably large number, it is expected that the theoretical and experimental results would be identical. It can also be seen that all three estimators are able to produce unbiased estimates of the combustor exit temperature, T40; however, their estimates of LPT exit temperature, T50, net thrust, Fn, and LPC stall margin, SmLPC, are biased. The encouraging finding is that the new systematic approach to tuner selection significantly reduces the overall mean squared estimation error compared to the other two approaches. Relative to the conventional approach of tuner selection the experimental mean squared estimation errors in T40, T50, Fn and SmLPC are reduced 76%, 82%, 80% and 63%, respectively. It can also be observed that the SVD tuner selection approach, which is designed to reduce the estimation error bias, does in fact reduce the sum of squared biases relative to the subset of health parameters approach. However, the SVD approach is also found to increase the estimation variance, which contributes to its overall mean squared estimation error.

A visual illustration of the effect that tuner selection has on Kalman filter estimation accuracy can be seen in FIGS. 6-9, which show actual and estimated results for the auxiliary parameters T40, T50, Fn and SmLPC respectively. Each plot shows a 300 s segment of the evaluated test cases. The step changes that can be observed in each plot every 30 s correspond to a transition to a different health parameter vector. True model auxiliary parameter outputs are shown in black, and Kalman filter estimates are shown in red. In each figure the information is arranged top to bottom according to tuner selection based upon: a) a subset of health parameters; b) singular value decomposition; and c) the new systematic selection strategy. The information shown in these figures corroborates the information in FIG. 5; namely all three tuner selection approaches produce unbiased estimates of T40 (FIG. 6), while the systematic tuner selection strategy yields a noticeable reduction in the total squared estimation error (squared bias plus variance) of all four auxiliary parameters.

The presented systematic tuner selection strategy minimizes the mean squared error of the on-line estimator at steady-state operating conditions, taking advantage of prior knowledge of engine health parameter distributions. As such it is somewhat analogous to the maximum a posteriori (MAP) estimation method which is commonly applied for ground-based aircraft gas turbine engine gas path analysis. This leads to the question, how does the on-line Kalman filter estimation accuracy compare to MAP estimation accuracy? Prior to making this comparison the mathematical formulation of the MAP estimator is briefly introduced. Here a steady-state model of the Measurement process in the following form is applied $$y_k = Hh_k + v_k \quad (39)$$

where the matrix H relates the effects of the health parameter vector, h, to the sensed measurements, y. From Eq. (19), it can be seen that H is equivalent to $C(I-A)^{-1}L+M$. The maximum a posteriori (MAP) estimator follows the closed Form expression $$\hat{h}_k = (P_h^{-1} + H^T R^{-1} H)^{-1} H^T R^{-1} y_k \quad (40)$$

The MAP estimator is capable of estimating more unknowns than available measurements due to the inclusion of a priori knowledge of the estimated parameter covariance, $P_h$. However, the MAP estimator, unlike a Kalman filter, is not a recursive estimator and does not take advantage of past measurements to enhance its estimate at the current time step. Furthermore, the MAP estimator only considers a static relationship between system state variables and measured outputs—it does not consider system dynamics. Because of these differences a Kalman estimator with optimally selected tuning parameters should outperform the MAP estimator However, under steady-state conditions, with minimal sensor noise the two estimation approaches should produce similar results. To test this theory, a MAP estimator was designed and its estimation accuracy was compared to a Kalman filter with tuning parameters optimally selected to minimize the estimation errors in the health parameter vector h. First, the two estimators were designed and evaluated using the original sensor noise levels shown in FIG. 3. Next, the sensor noise levels were set to 1/20th of their original levels, the estimators were re-designed, and the comparison was repeated. Monte Carlo simulation evaluations as previously described were applied (i.e., 375 random health parameter vectors, 30 s in duration, with estimation accuracy calculations based upon the last 10 s of each 30 s test case). Theoretical and experimental estimation errors are shown in FIGS. 10 and 11 for the original noise and reduced noise levels, respectively. At original noise levels the Kalman estimator is able to produce smaller estimation errors. However, at the reduced noise level the two estimation approaches are found to be nearly identical. This comparison validates that the Kalman estimation approach is indeed producing a minimum mean squared estimation error as intended, while providing the capability to support real-time on-line estimation under dynamic operating scenarios.

Figure 12:
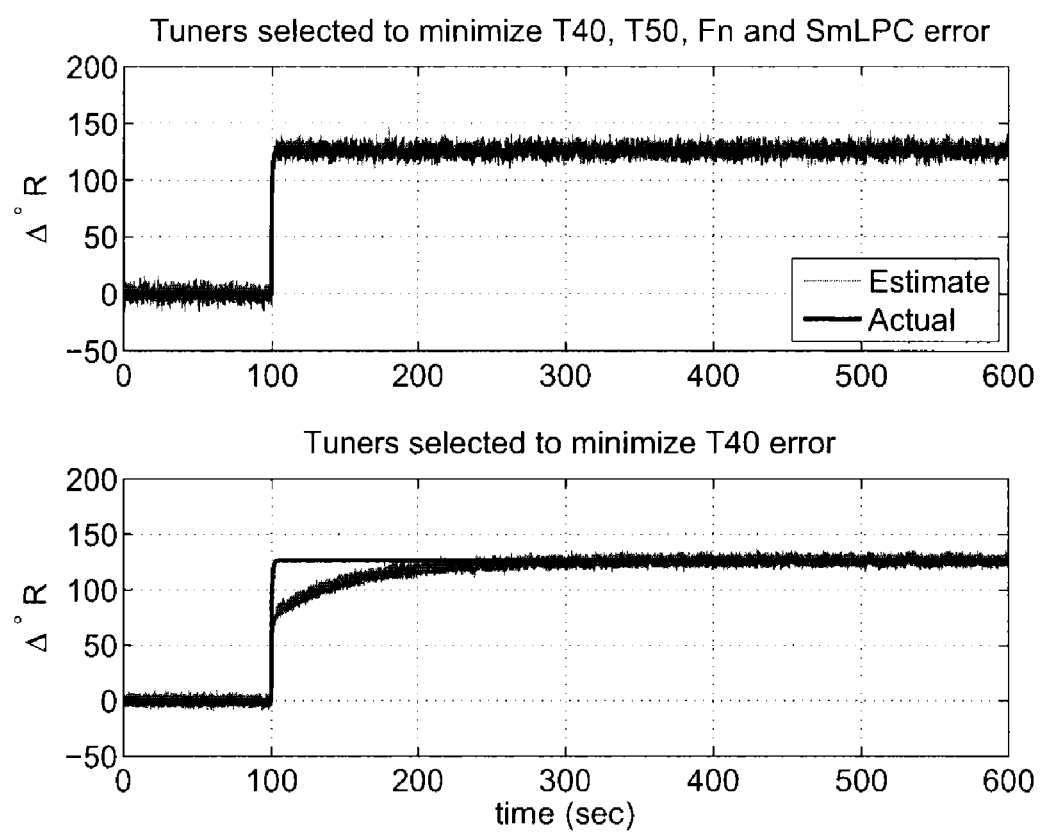
FIG. 12 illustrates a graph of tuner impact on estimator response.

While the systematic tuner selection approach presented here appears promising for on-line Kalman filter based parameter estimation applications, there are several practical considerations which need to be assessed when applying such a technique. The optimization routine attempts to minimize the overall squared estimation error—both bias and variance—under steady-state operating conditions. The minimization of the estimation variance in particular can come at the expense of dynamic responsiveness of the Kalman filter. To illustrate this consider the time history plots of actual versus estimated T40 shown in FIG. 12. The top plot shows Kalman filter estimation results using a tuning parameter vector systematically selected to minimize the error in four auxiliary parameters (T40, T50, Fn and SmLPC) as presented in the previous section. The bottom plot shows Kalman filter estimation results using a tuning parameter vector systematically selected to minimize the estimation error in T40 only. At time 100 s a step change in the health parameter input vector is introduced into the engine model; this allows the dynamic response of the two estimators to be compared. It can be observed that T40 estimation variance in the bottom plot is reduced, as is the mean steady-state estimation error (>300 s). This is not surprising since one would generally expect improved results when optimizing to minimize the error in a single parameter, as opposed to multiple parameters. However, the estimator shown in the bottom plot does require a significantly longer time to reach steady-state convergence. Conversely, the estimator designed to minimize the steady-state error in four auxiliary parameters (top plot) is unable to place as much emphasis on T40 estimation variance reduction, but it is able to track dynamic changes in T40 more rapidly. This example illustrates the inter-dependence between estimation variance and responsiveness. Therefore, it is prudent for a designer to evaluate the Kalman filter to ensure that it tracks engine dynamics acceptably. If the dynamic response is unacceptable, the optimization routine can be re-run placing more weight on estimation error bias reduction, and less weight on variance reduction.

In an embodiment, the present approach produces an optimal set of tuning parameters, not just at a single operating point but rather a globally optimal tuning parameter vector universally applicable over the range of operating conditions that an engine is expected to experience. A potential approach to selecting a single "globally optimal" tuning parameter vector is to modify the optimization routine to minimize the combined estimation error over multiple engine operating points such as takeoff, climb and cruise. This would be a straightforward modification to the Matlab® optimization routine, but it would increase the computational time required to calculate the result. Since the systematic tuner selection process is only envisioned to be done once during the system design process, this will not impact the on-line execution speed of the Kalman filter. It is anticipated that the application of globally optimal tuners will result in some estimation accuracy degradation relative to tuners optimized for individual operating points, although this has not yet been verified or quantified.

A systematic approach to tuning parameter selection for on-line Kalman filter based parameter estimation has been presented. This technique is specifically applicable for the underdetermined aircraft engine parameter estimation case where there are fewer sensor measurements than unknown health parameters which will impact engine outputs. It creates and applies a linear transformation matrix, V*, to select a vector of tuning parameters which are a linear combination of all health parameters. The tuning parameter vector is selected to be of low-enough dimension to be estimated, while minimizing the mean-squared error of Kalman filter estimates. The multiparameter iterative search routine applied to optimally select V* was presented. Results have shown that while the transformation matrix returned by the optimization routine is not unique (different matrices can be found which produce a global minimum of the objective function), the routine is effective in returning a transformation matrix which is optimal, or near optimal, regardless of its initial starting guess of the matrix. The efficacy of the systematic approach to tuning parameter selection was demonstrated by applying it to parameter estimation in an aircraft turbofan engine linear point model. It was found to significantly reduce mean squared estimation errors compared to the conventional approach of selecting a subset of health parameters to serve as tuners. In some parameters the mean squared estimation error reduction was found to be over 80%. These estimation improvements were theoretically predicted and experimentally validated through Monte Carlo simulation studies.

The systematic approach to Kalman filter design may be applicable for a broad range of on-board aircraft engine model-based applications which produce estimates of unmeasured parameters. This includes model based controls, model-based diagnostics, and on-board life usage algorithms. It also may have benefits for sensor selection during the engine design process, specifically for assessing the performance estimation accuracy benefits of different candidate sensor suites.

The methods and processes described herein may be performed by a hardware or software system or combination thereof. For example, a computing system may be configured to receive input signals from an engine by way of a plurality of sensors, and model the health parameters using the Kalman filter approach described herein. The computing system may comprise a processor or CPU, a memory, and a storage device, as is known in the art. The computing system may further include a logic configured to receive the input signals from the engine and determine estimates for unknown parameters. The computing system may modify the engine control based on an estimated unknown parameter or parameters determined by the logic using the methods and processes described herein.

As used herein, the term "logic" includes but is not limited to a software, a firmware, an executable program, a hardware or hard-wired circuit, or combinations thereof. For example, based on a desired application or needs, logic may include a software controlled microprocessor, discrete logic like an application specific integrated circuit (ASIC), an analog circuit, a digital circuit, a programmed logic device, a memory device containing instructions, or the like. Logic may include one or more gates, combinations of gates, or other circuit components. Logic may also be fully embodied as software. Where multiple logical logics are described, it may be possible to incorporate the multiple logical logics into one physical logic. Similarly, where a single logical logic is described, it may be possible to distribute that single logical logic between multiple physical logics.

Although the preferred embodiments of the present invention have been illustrated in the accompanying drawings and described in the foregoing detailed description, it is to be understood that the present invention is not to be limited to just the preferred embodiment disclosed, but that the invention described herein is capable of numerous rearrangements, modifications and substitutions without departing from the scope of the claims hereafter.

We claim:

1. A method of optimizing the estimated performance and estimated condition of an engine comprising:
estimating a plurality of engine parameters based on a plurality of sensor inputs, wherein said engine parameters include a set of health parameters and a set of performance parameters, and wherein the number of health parameters in said set is greater than the number of sensors;
determining a relationship between said set of health parameters and a tuning vector, wherein said tuning vector is a linear combination of said entire set of health parameters;
determining at least one state equation in terms of said tuning vector;
solving said at least one state equation to determine an estimate for said set of health parameters;
estimating said performance parameters based on said health parameter estimates;
calculating the error in said estimation of said health parameters and said performance parameters;
optimizing said relationship between said tuning vector and said set of health parameters based on said error calculation;
determining an optimized tuning vector based on said optimized relationship;
determining at least one optimized state equation in terms of said optimized tuning vector;
solving said at least one optimized state equation to determine an optimized estimate of said engine parameters.

2. The method of claim 1, wherein calculating the error includes calculating the mean estimation error.

3. The method of claim 1, wherein said performance parameters are a function of said health parameters.

4. The method of claim 1, wherein said relationship between said tuning vector and said set of health parameters is optimized to minimize the error in estimating a given subset of said health parameters.

5. The method of claim 1, wherein said relationship between said tuning vector and said set of health parameters is optimized to minimize the error in estimating a given subset of said performance parameters.

6. The method of claim 1, wherein said relationship between said tuning vector and said set of health parameters is optimized to minimize the error in estimating a combination of a given subset of said health parameters and a given subset of said performance parameters.

7. The method of claim 1, wherein the dimension of said tuning vector is less than or equal to the number of said sensors.

8. The method of claim 1, wherein said relationship between said health parameters and said tuning vector is defined by a matrix.

9. The method of claim 8, wherein a first dimensions of said matrix is equal to the dimension of said tuning vector.

10. The method of claim 9, wherein a second dimension of said matrix is less than or equal to the number of said health parameters.

11. The method of claim 1 further comprising the step of modifying control of said engine based on said optimized estimate of said engine parameters.

12. The method of claim 1 wherein solving said state equation includes constructing a Kalman filter.

13. An optimal tuning system comprising:
a plurality of sensors capable of sensing engine parameters;
a logic in operable communication with said plurality of sensors and configured to receive input from said plurality of sensors, said logic configured to determine optimized parameters related to the estimated performance and condition of said engine;

wherein said logic estimates a plurality of engine parameters based on said sensors, said engine parameters including a set of health parameters and a set of performance parameters, and wherein the number of health parameters in said set is greater than the number of sensors;

wherein said logic determines a relationship between said set of health parameters and a tuning vector that is a linear combination of said entire set of health parameters;

wherein said logic determines at least one state equation in terms of said tuning vector and solves said at least one state equation to determine an estimate for said set of health parameters;

wherein said logic estimates said performance parameters based on said health parameter estimates and calculates the error in said estimation of said health parameters and said performance parameters;

wherein said logic optimizes said relationship between said tuning vector and said set of health parameters based on said error calculation;

wherein said logic determines an optimized tuning vector based on said optimized relationship;

wherein said logic determines at least one optimized state equation in terms of said optimized tuning vector wherein said logic solves said at least one optimized state equation to determine an optimized estimate of said engine parameters.

14. The optimal tuning system of claim 13, wherein said logic comprises multiple logics.

15. The optimal tuning system of claim 14, wherein said optimized tuning vector is defined within one of said multiple logics.

16. The optimal tuning system of claim 13, wherein said logic calculates the mean estimation error in said estimation of said health parameters and said performance parameters.

17. The optimal tuning system of claim 13, wherein said performance parameters are a function of said health parameters.

18. The optimal tuning system of claim 13, wherein said logic optimizes said relationship between said tuning vector and said set of health parameters to minimize the error in estimating a given subset of said health parameters.

19. The optimal tuning system of claim 13, wherein said logic optimizes said relationship between said tuning vector and said set of health parameters to minimize the error in estimating a combination of a given subset of said health parameters and a given subset of said performance parameters.

20. The optimal tuning system of claim 13, wherein said logic solves said state equation by constructing a Kalman filter.

21. The optimal tuning system of claim 13, wherein said logic is capable of modifying control of said engine based on said optimized estimate of said engine parameters.

22. The optimal tuning system of claim 13, wherein the dimension of said tuning vector is less than or equal to the number of said sensors.

* * * * *